US006219170B1

United States Patent
Kimura et al.

(10) Patent No.: US 6,219,170 B1
(45) Date of Patent: Apr. 17, 2001

(54) LIGHT MODULATION DEVICE, EXPOSING DEVICE AND DISPLAY UNIT

(75) Inventors: Koichi Kimura; Mitsuyoshi Ichihashi, both of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/351,175

(22) Filed: Jul. 12, 1999

(30) Foreign Application Priority Data

Jul. 13, 1998 (JP) .................................................. 10-197731
Jul. 13, 1998 (JP) .................................................. 10-197732

(51) Int. Cl.[7] ...................................................... G02F 1/03
(52) U.S. Cl. .......................... 359/248; 359/245; 349/25; 349/28; 349/113
(58) Field of Search .................................. 359/248, 245; 349/25, 113, 28

(56) References Cited

U.S. PATENT DOCUMENTS 5,384,649 * 1/1995 Takimoto et al. ..................... 359/67
5,583,676 * 12/1996 Akiyama et al. ..................... 349/28

* cited by examiner

Primary Examiner—Georgia Epps
Assistant Examiner—Timothy Thompson
(74) Attorney, Agent, or Firm—Sughrue, Mion, Zinn, Macpeak & Seas, PLLC

(57) ABSTRACT

A light modulation device incorporating: a semiconductor layer 3 formed on the upper surface of a lower transparent electrode 2 and made of an n-type semiconductor material; and an upper transparent electrode 5 formed on the upper surface of the semiconductor layer 3 through an insulating layer 4, wherein an electric field is applied vertically such that the upper transparent electrode 5 is negative and the lower transparent electrode 2 is positive to deplete carriers of the n-type semiconductor layer 3 so as to change at least either one of reflectance of light or adsorbance of light.

27 Claims, 12 Drawing Sheets

● : ELECTRON
⊕ : DONOR IMPURITY ION

○ : POSITIVE HOLE
⊖ : ACCEPTOR IMPURITY ION

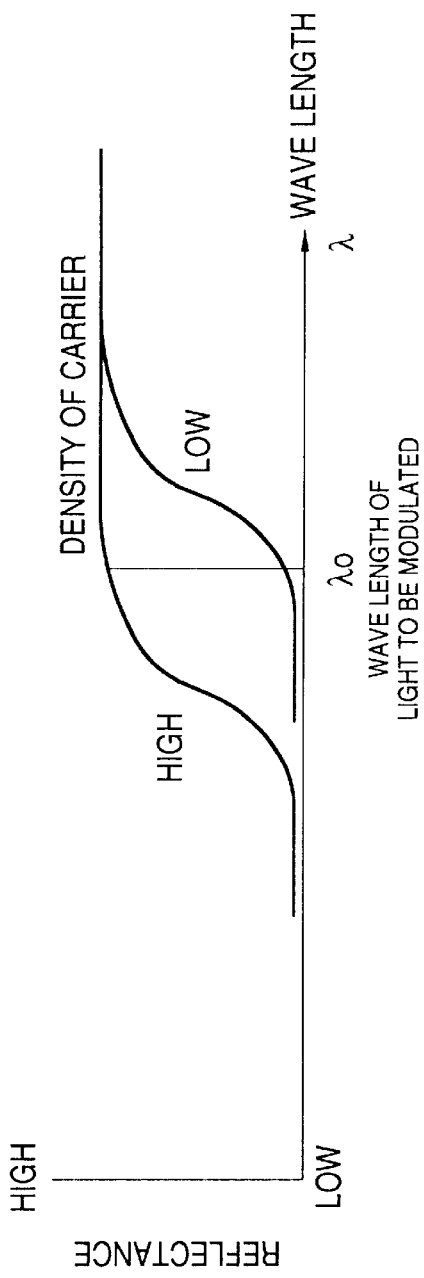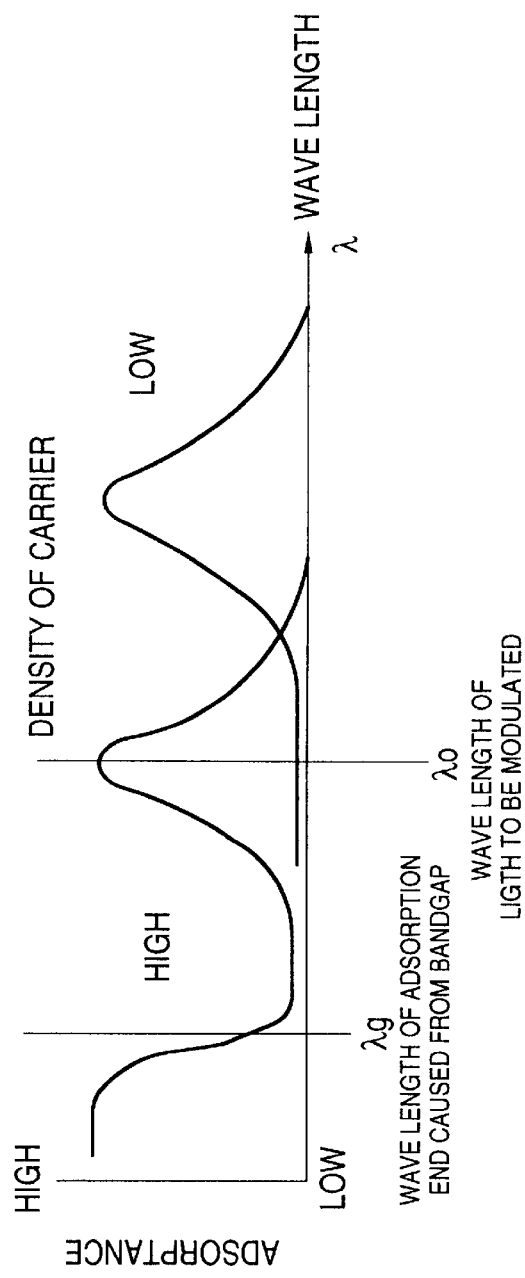

● : ELECTRON
⊕ : DONER IMPURITY ION

● : ELECTRON
⊕ : DONOR IMPURITY ION
○ : POSITIVE HOLE
⊖ : ACCEPTOR IMPURITY ION

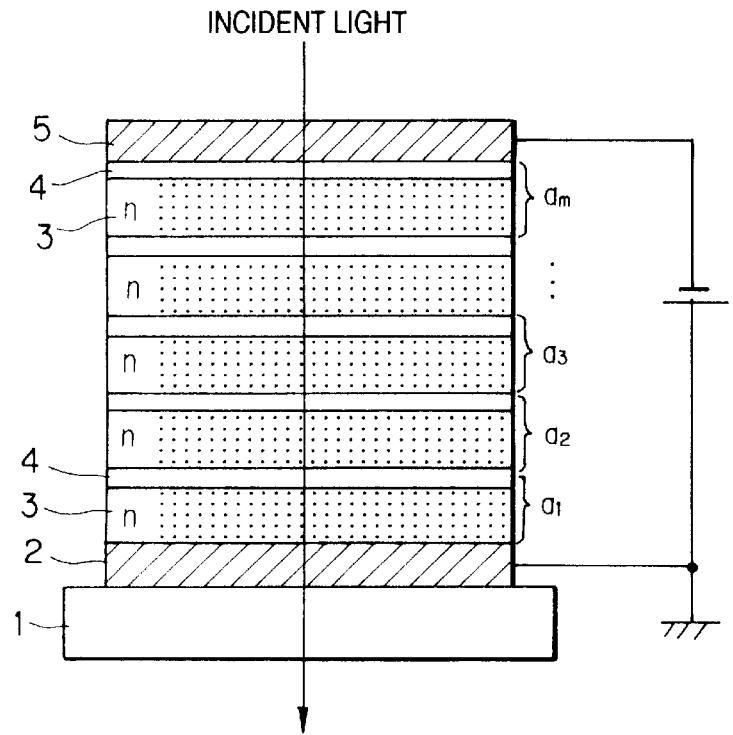

EQUIVALENT CIRCUIT

EQUIVALENT CIRCUIT

LIGHT MODULATION DEVICE, EXPOSING DEVICE AND DISPLAY UNIT

BACKGROUND OF THE INVENTIONe

1. Field of the Invention

The present invention relates to a light modulation device, and more particularly to a light modulation device which is capable of modulating light in the infrared wavelength region to the visible ray region and performing exposure and display using light in the foregoing region.

2. Description of the Related Art

Hitherto, devices for modulating light, exposing a photosensitive material to light or performing display by using the modulate include an electro-optical crystal, such as LN (lithium niobate: LiNbO3), KDP (potassium phosphate: KH2PO4) or ADP (ammonium phosphate: NH4H2PO4), using the Pockels effect or electro-optical crystal, such as PLZT, mainly using the Kerr effect.

The foregoing liquid crystal devices, which can be operated at low voltage, however, suffer from unsatisfactorily low response speed and excessive dependency on the environment including temperature. TN (Twist Nematic) type liquid crystal and birefringent liquid crystal, which are main types of the liquid crystal, must be used with a polarizing plate. Thus, there arises a problem of light absorption owning to the polarizing plate.

As a new light modulation device, which is capable of overcoming the foregoing problems, a technique has been disclosed in Japanese Patent Laid-Open No. 9-179082. As shown in FIG. 16, dielectric substances 113, such as PZT or PLZT, are, in a space between glass substrates 111 and 112, held between transparent electrodes 114 and 15. Then, voltage is applied so that light modulation is performed. The principle which is used to perform the light modulation is as follows: when the space between the two transparent electrodes is not applied with voltage, penetration of light is permitted. When voltage is applied to the space, electrons are charged in the cathode side of the transparent electrode. Thus, the density of electrons is raised so that light is reflected by the transparent electrode adjacent to the cathode. The foregoing method enables light modulation to be performed without the polarizing plate.

In the foregoing light modulation process, the density of electrons required to perform the light modulation is raised as the wavelength of light is shortened. Therefore, enlargement of the number of electrons, which must be charged, is required to induce raising of the density of electrons in the light modulation device. To operate the device, the electrostatic capacity between the electrodes must be enlarged. Therefore, the foregoing dielectric substance must be a material, for example, PZT or PLZT which is a ceramic-type high dielectric-constant substance, having a significantly high dielectric constant. The foregoing materials having the high dielectric constant, however, cannot easily be formed into a thin film having a stable dielectric constant. Therefore, there arises a problem in that the density of electrons around the transparent electrode cannot stably be controlled.

In recent years, light modulation devices using the field-optical effect of the semiconductor or control of the density of carriers in a p-n junction structure have been developed. All of the developed devices are arranged to perform light modulation in the vicinity of the wavelength near an end of light absorption by using band gap energy. There has not been developed a device of a type for performing the light modulation in the visible ray region or changing the reflectance of light in the foregoing region.

An electric optical crystal is able to perform a high-speed response and is free from excessive dependency on the environment. However, an electric optical crystal of a type using the Pockels effect requires very high operating voltage. An electric optical crystal of a type using the Kerr effect can be operated at relatively low voltage which is excessively higher than that required for the liquid crystal device. What is worse, the electric optical crystal cannot be used to form a precise array structure. Since the electric optical crystal requires a polarizing plate, there arises a problem of absorption of light due to the provided polarizing plate.

SUMMARY OF THE INVENTION

To overcome the foregoing problems experienced with the conventional light modulation devices, an object of the present invention is to provide a light modulation device, an exposing device and a display unit each having a simple structure, capable of quickly and stably operating even at low voltage and corresponding to visible rays to infrared rays.

To achieve the foregoing object, a light modulation device of one of the embodiments in the present invention comprises: a semiconductor layer formed on the upper surface of a lower transparent electrode; and an upper transparent electrode formed on the upper surface of the semiconductor layer through an insulating layer, wherein an electric field for depleting carriers of the semiconductor layer is applied to a space between the upper transparent electrode and the lower transparent electrode so as to change at least either of reflectance of light or adsorptance of light Further, a light modulation device of one of other embodiments in the present invention comprises: a first semiconductor layer made of an n-type semiconductor material or a p-type semiconductor material and formed on the upper surface of a lower transparent electrode; a second semiconductor layer formed on the upper surface of the first semiconductor layer and made of the p-type semiconductor material when the first semiconductor layer is made of the n-type semiconductor and made of the n-type semiconductor material when the first semiconductor layer is made of the p-type material; and an upper transparent electrode formed on the upper surface of the second semiconductor layer, wherein an electric field for depleting carriers of the semiconductor layers is applied to a space between the upper transparent electrode and the lower transparent electrode so as to change at least either of reflectance of light or adsorptance of light.

The light modulation device such as disclosed in the embodiments of this invention is arranged to be applied with an electric field, which depletes carriers of the semiconductor layer, to the space between the upper transparent electrode and the lower transparent electrode to change at least either of adsorptance of light or reflectance of light. Therefore, when the electric field is applied, the light modulation device permits penetration of incident light. When the electric field is not applied, the light modulation device absorbs or reflects incident light, that is, inhibits penetration. The above-mentioned light modulation device has the foregoing light modulation characteristic.

BRIEF DESCRIPTION OF THE DRAWINGS

FIGS. 1(*a*) and 1(*b*) are the graphs showing the relationship among wavelength λ, reflectance and the adsorptance of incident light with respect to the density of carriers.

FIG. 6 is a diagram showing the cross sectional structure and wiring between layers of the laminated light modulation device according to a third embodiment of the present invention.

FIG. 7 is a diagram showing the cross sectional structure and wiring between layers of the laminated light modulation device according to a fourth embodiment of the present invention.

DESCRIPTION OF THE PREFERRED EMBODIMENTS

Figure 2:
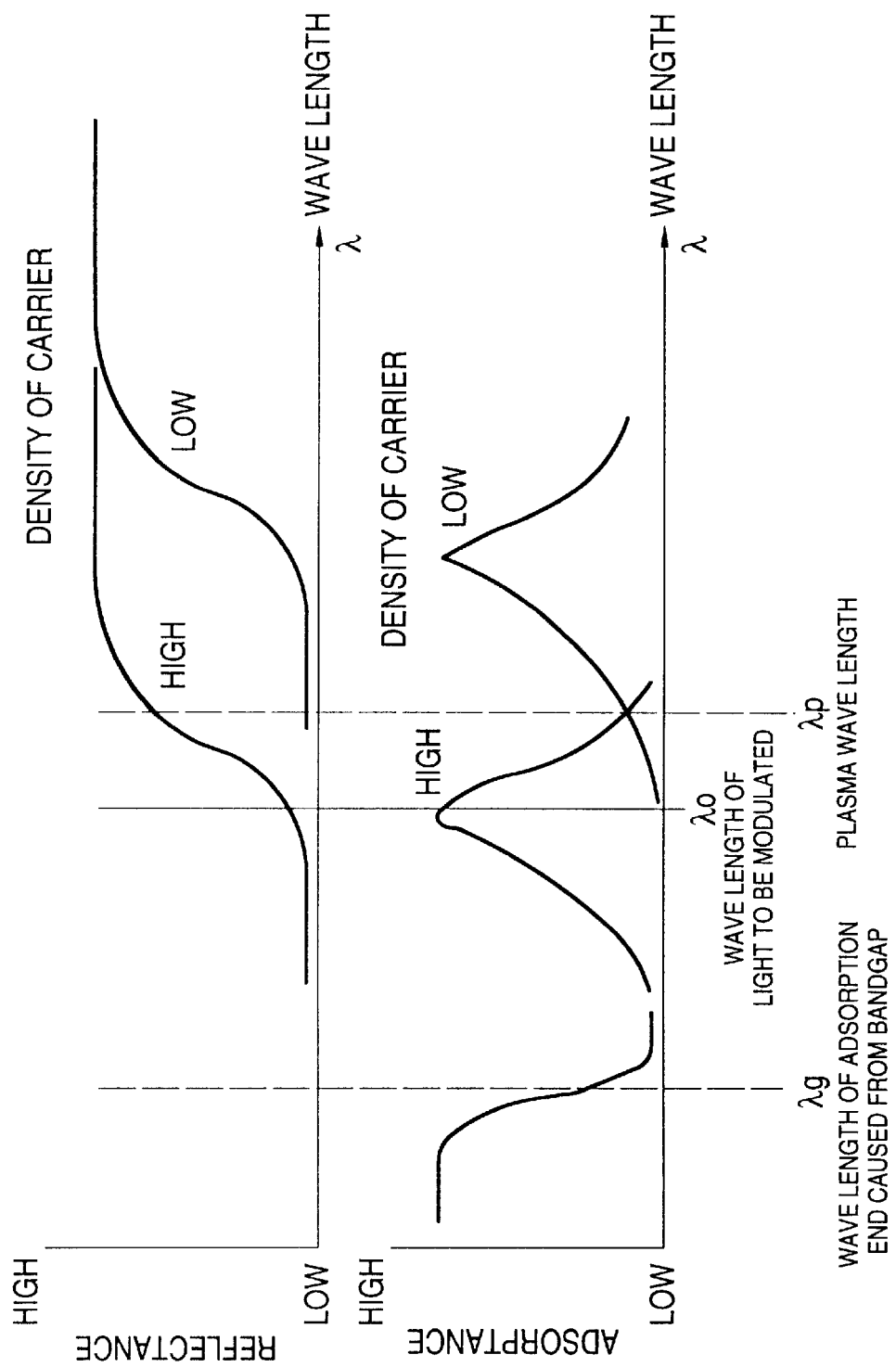
FIG. 2 is a graph showing the relationship among the reflectance and the adsorptance with respect to the density of carriers in a case where the wavelength of light, which must be modulated, is short with respect to the plasma wavelength of an n-type semiconductor layer.

Initially, the principle of the operation of a light modulation device according to the present invention will now be described.

In general, materials, such as metal, semimetal or semiconductors each having a high density, containing a large quantity of free electrons, have characteristics of reflecting incident light having a wavelength longer than its plasma wavelength. The foregoing characteristic is called plasma reflection. The foregoing plasma wavelength can be calculated as a plasma frequency in accordance with the following equation (2):

$$\omega p = \sqrt{\frac{Ne^2}{\varepsilon_0 \varepsilon_{up} m_{up}}} \quad (1)$$

$$\lambda p = \frac{2\pi}{\omega p} \quad (2)$$

In equations (1) and (2), $\omega_p$ is a plasma frequency, N is the density of carriers, e is the charge of electrons, $\varepsilon_0$ is dielectric constant of vacuum, $\varepsilon_{op}$ is optical dielectric constant, $m_{op}$ is optically effective mass and $\lambda_p$ is plasma wavelength.

As can be understood from the foregoing equations, change of the carrier density N causes the plasma wavelength $\lambda_p$ to be changed. When the carrier density N is raised, the plasma wavelength $\lambda_p$ is shifted to a short wavelength region. When the carrier density N is lowered, the plasma wavelength $\lambda_p$ is shifted to a long wavelength region.

FIG. 1(a) is a graph showing the relationship between the wavelength $\lambda$ of incident light and reflectance ratio when the carrier density has been set to be a high density and when the same is set to be a low density.

Referring to FIG. 1(a), the reflectance of incident light having the wavelength $\lambda_0$ is raised when the carrier density has been raised owing to the foregoing characteristic of the plasma wavelength $\lambda_p$. Thus, incident light is reflected by the surface of the material. When the carrier density is set to be a low density, the reflectance is lowered. Thus, incident light is introduced into the material.

FIG. 1(b) is a graph showing the relationship between the wavelength $\lambda$ of incident light and adsorptance of a semiconductor material. The conventional semiconductor light modulator performs light modulation by using a region in which the adsorptance of light is changed in the vicinity of the adsorption end wavelength $\lambda_g$ caused by the band gap. The present invention is characterized in that light modulation is performed in the wavelength region from infrared ray to visible ray.

In general, the band gap energy of a semiconductor is Eg [eV], speed of light in a vacuum is c [M/s] and the Planck's constant is h [Js], adsorption end wavelength $\lambda_g$ [m] of light is expressed as follows:

$$\lambda g = \frac{hc}{E_g} \quad (3)$$

Since the wavelength $\lambda_0$ of light which must be modulated is longer than $\lambda_g$ in the present invention, it is preferable that a semiconductor material which satisfies the conditions expressed by equation (4) is employed.

$$E_g > \frac{hc}{\lambda_0} \quad (4)$$

When light from visible ray to infrared ray is modulated, it is preferable that the band gap energy Eg is 2 [eV] or greater. Preferred examples of the semiconductor materials of the foregoing type are C, ZnO, SiC, CdS, GaP, AlAs, InN, AlN and the like.

When the carrier density is set to be a high level with respect to incident light having the wavelength $\lambda_0$ in the case shown in FIG. 1(b), incident light introduced into the material is adsorbed and penetration is inhibited. When the carrier density is set to be a low level, the adsorbance is lowered. Thus, introduced incident light is not substantially adsorbed and penetration is permitted.

Figure 3:
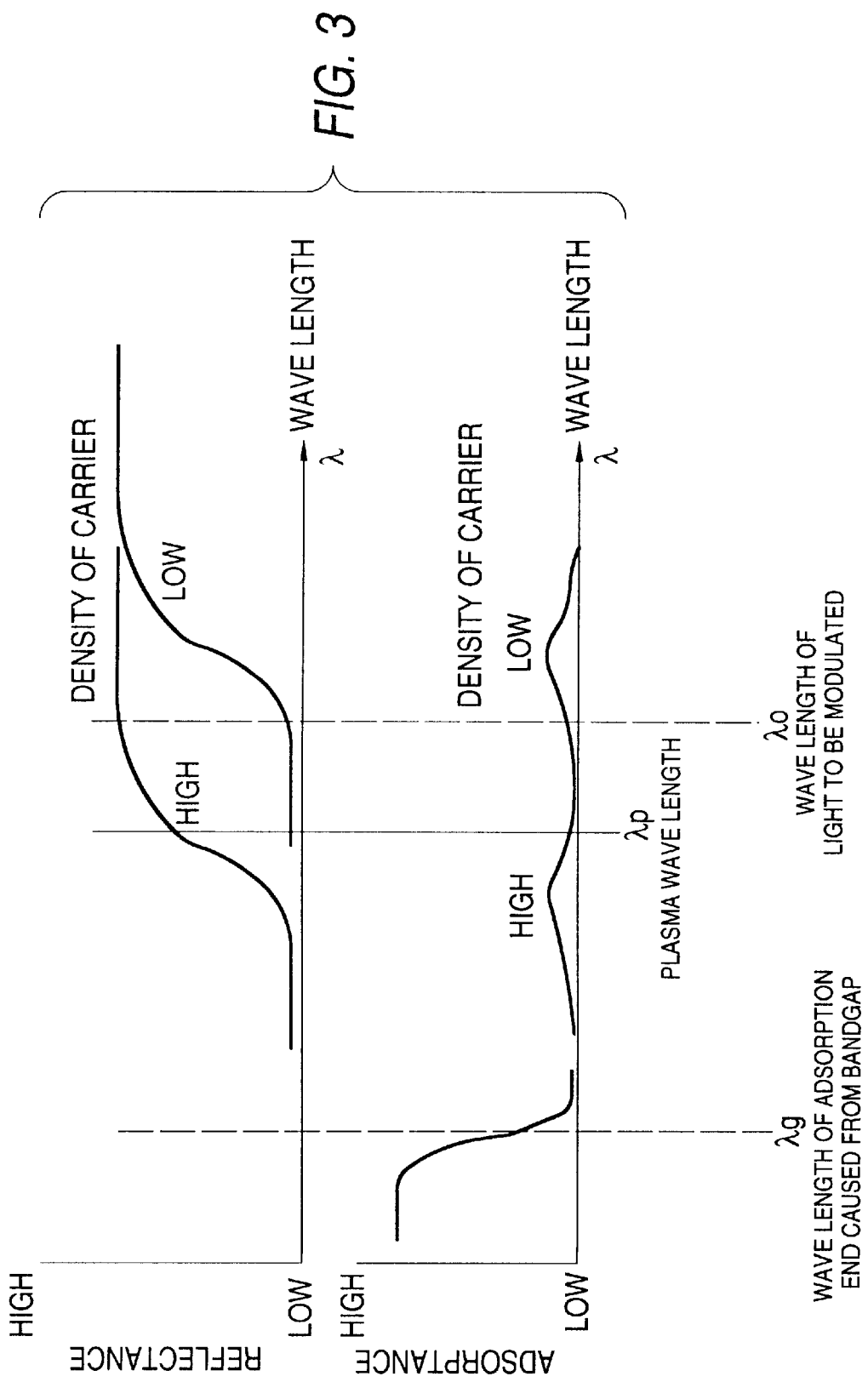
FIG. 3 is a graph showing the relationship among the reflectance and the adsorptance with respect to the density of carriers in a case where the wavelength of light, which must be modulated, is long with respect to the plasma wavelength of an n-type semiconductor layer.

As a result of the above-mentioned characteristics of the material, application of material to the material to change the carrier density enables light modulation of predetermined incident light, that is, incident light having the wavelength $\lambda_0$ to be performed such that penetration or non-penetration (reflection and adsorption) is selected. A combination is considered in which the light modulation using the reflectance and the light modulation using the permeability are combined with each other. When the reflectance of light is lowered by depleting electrons, also the permeability must be lowered because penetration of incident light is permitted without adsorption in the material. Therefore, a combination of the reflectance and the adsorbance of incident light with respect to the wavelength is considered as shown in FIGS. 2 and 3.

When the wavelength $\lambda_0$ of light which must be modulated is shorter than the plasma wavelength $\lambda_p$ of an n-type semiconductor layer in a state of no electric field, the reflectance is lowered regardless of the carrier density. Therefore, light modulation using change in the adsorbance becomes predominant. When application of the electric field is inhibited, the adsorbance realized by adsorbing free carriers in the semiconductor layer is raised. Thus, the permeability of light is lowered. When the electric field has been applied, the n-type semiconductor layer is depleted. Thus, the carrier density is lowered and, therefore, the adsorbance is lowered. As a result, the permeability of light is raised. As a result, incident light introduced into the material without any reflection is light-modulated owning a change in the permeability of light in the material.

To realize sufficient change in the permeability, the thickness of the semiconductor layer, the density of carriers and the width of the depletion region which must be changed must arbitrarily be determined. To raise the adsorbance in a state where the electric field is not applied, it is preferable that the semiconductor layer is thickened sufficiently to correspond to the carrier density.

When the wavelength $\lambda_0$ of light which must be modulated is longer than the plasma wavelength $\lambda_p$ of the n-type semiconductor layer in a state of no electric field, light modulation using the change in the reflectance becomes predominant. When application of the electric field is inhibited, the carrier density of the semiconductor layer is raised. Thus, the reflectance is raised. When the electric field is being applied, the n-type semiconductor layer is depleted. The carrier density is lowered and, therefore, the reflectance is lowered. As for the adsorbance realized when the reflectance is low, raising of the adsorbance is prevented. As a result, incident light is light-modulated owning to a change in the reflectance on the surface of the material.

To realize sufficient change in the permeability, the thickness of the semiconductor, the carrier density and the width of the depletion layer which must be changed must arbitrarily be determined. To raise the permeability in a depleted state, it is preferable that the semiconductor layer is sufficiently thinned to correspond to the carrier density.

The present invention is characterized in that the above-mentioned principle is applied to a structure constituted by sequentially laminating a transparent electrode, an insulating material and an n-type semiconductor and such as represented by a MOS semiconductor structure or p-n junction semiconductor material with which the control of the carrier density can easily be performed. The obtained laminated structure is caused to directly act as an optical modulation device.

The above-mentioned laminated structure incorporates the transparent electrode and the insulating material which are transparent with respect to light which must be modulated. Only the carrier density of electrons in the n-type semiconductor layer causes the change of the permeability to be changed. As a result, only a simple structure is required to perform stable light modulation.

It is preferable that the specific density of impurities in the n-type semiconductor is $10^{18}$ [cm$^{-3}$] to $10^{22}$ [cm$^{-3}$]. Embodiments of the present invention will now be described with reference to the drawings.

FIG. 4 is a diagram showing the cross sectional structure of a light modulation device according to a first embodiment of the present invention.

Figure 4A:
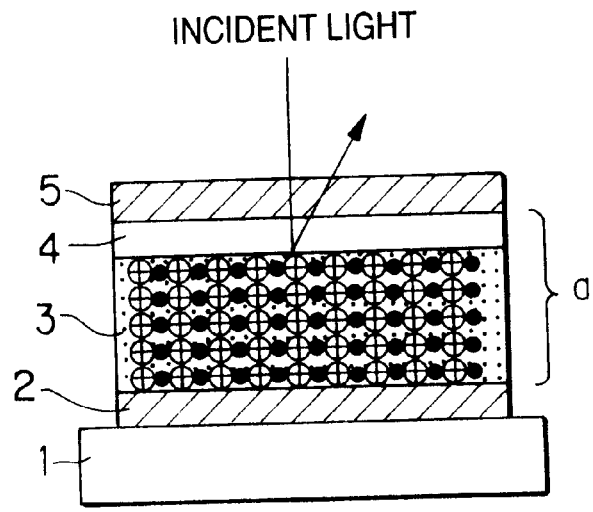
FIGS. 4(a) and 4(b) are the diagrams showing the principle of the operation of a light modulation device according to the embodiment of the present invention.

The light modulation device according to this embodiment, as shown in FIG. 4(a), has a structure of the MIS semiconductor incorporating a lower transparent electrode 2 formed on the upper surface of the transparent substrate 1. Moreover, an n-type semiconductor layer 3 which is a semiconductor containing doped impurities is formed on the upper surface of the lower transparent electrode 2. An insulating layer 4 is formed on the upper surface of the n-type semiconductor 3. Moreover, an upper transparent electrode 5 is formed on the upper surface of the insulating layer. Hereinafter, a pair of the n-type semiconductor layer 3 and the insulating layer 4 is called a light modulation layer a. In the state shown in FIG. 4(a), donor impurity ions and electrons are uniformly dispersed in the n-type semiconductor layer 3. Thus, a state free from lowering of the carrier density is realized. When the wavelength $\lambda_0$ of light is longer than the plasma wavelength $\lambda_p$ of the semiconductor, incident light is mainly reflected by the surface. When the foregoing wavelength is shorter than the plasma wavelength $\lambda_p$, mainly adsorption takes place. As a result, incident light is not emitted to a portion below the transparent substrate 1.

Figure 4B:
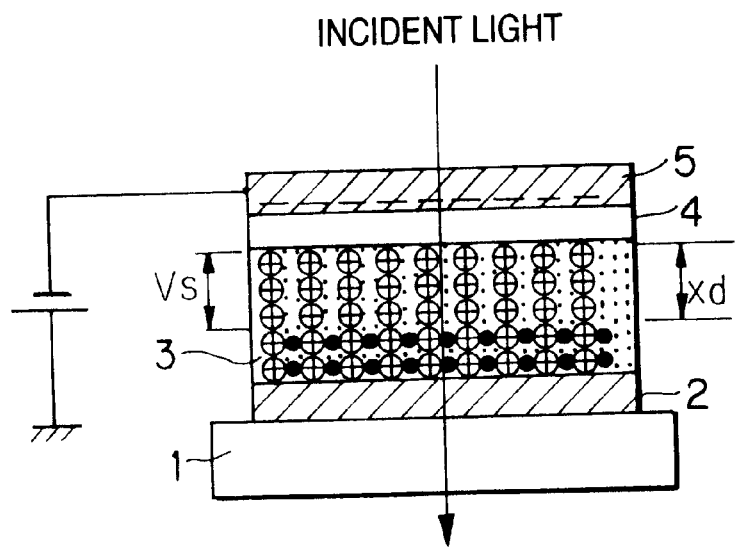

FIG. 4(b) shows a state in which the transparent electrodes 2 and 5 of the light modulation device shown in FIG. 2(a) have been applied with inverse bias voltage. That is, negative potential −V has been applied to the upper transparent electrode with respect to the lower transparent electrode 2. As a result, electron carriers in the n-type semiconductor layer 3 are moved to the lower transparent electrode 2. Thus, a depletion layer in which electron carriers are depleted is formed. Therefore, the plasma wavelength $\lambda_p$ of the n-type semiconductor layer 3 is shifted to the long wavelength region. As a result, the surface reflectance of the n-type semiconductor layer 3 or the adsorbance in the n-type semiconductor layer 3 is lowered, causing the light permeability to be raised. Thus, incident light introduced from an upper portion penetrates the n-type semiconductor layer 3, and then emitted from a position below the transparent substrate 1. FIG. 4(b) shows the thickness $x_d$ of the depletion layer which is shortened. In actual, the foregoing thickness may be substantially the same as the thickness of the n-type semiconductor layer 3. In the foregoing case, the overall body of the n-type semiconductor layer 3 can be depleted so that the light modulation characteristic can be improved.

If the n-type semiconductor layer 3 is not completely depleted, the adsorbance is lowered. When the non-depletion region (the n-type region) is very thin, also reflection at the surface is limited. Therefore, control of the permeability of the light can be performed.

The thickness $x_d$ of the depletion layer formed in the n-type semiconductor layer 3 is expressed by the relationship shown in equation (5).

$$xd = \sqrt{\frac{2\varepsilon_s V_s}{eN_d}} \quad (5)$$

In equation (5), $\varepsilon_s$ is a dielectric constant of the depletion layer, $V_s$ is the difference of the potential of depletion layer and $N_d$ is the density of impurities in the n-type semiconductor layer. When the applied voltage is raised, the difference $V_s$ of the potential of the depletion layer is raised. As a result, the width $x_d$ of the depletion layer is enlarged. The foregoing characteristic can be obtained until an inverted state is realized in the interface between the insulating and the semiconductor, that is, positive hole carriers are injected into the interface.

When voltage is applied in such a manner that the width $x_d$ of the depletion layer is enlarged to about the thickness of the n-type semiconductor layer, substantially the overall body of the n-type semiconductor layer is depleted. Therefore, electron carriers do not spatially exist. As a result, the permeability of incident light is furthermore raised.

Change in the density of carriers which occurs owing to generation or disappearance of the foregoing depletion layer can be considered to be a phenomenon similar to charge/discharge which occurs in a capacitor.

A structure may be employed in which the transparent substrate is formed above the upper transparent electrode 5. In this case, enclosure of the light modulation device between the transparent substrates is permitted. Thus, handling can be facilitated.

The light modulation layer a may be structured such that the polarities of electrodes which are connected to the foregoing layers are maintained and the overall body is inverted vertically. That is, a structure may be employed in which the insulating layer 4 and the n-type semiconductor layer 3 are, in this order, laminated on the upper surface of the lower transparent electrode 2.

In general, the upper and lower transparent electrodes and an intermediate transparent electrode, to be described later, are made of metal made to be transparent by granulating or a metal compound having conductivity. As an alternative to this, a very thin and semi-transparent film of the foregoing metal may be employed. The metal material may be gold, silver, palladium, zinc or aluminum. The metal compound may be indium oxide, aluminum-added zinc oxide which is so called "AZO". Specifically, a SnO2 film (a Nesa film) or an ITO film are exemplified.

When the semiconductor is formed on the foregoing transparent electrode, the semiconductor is amorphous or polycrystal semiconductor. In the foregoing case, also the transparent electrode may be a usual amorphous glass substrate.

The lower transparent electrode may be omitted to make the lower surface of the n-type semiconductor layer to be the electrode.

The transparent substrate may be made of an insulating material, such as sapphire, or may be a semiconductor substrate similar to the light modulation layer or having a similar lattice constant. In the foregoing case, the transparent electrode and the transparent substrate may be used commonly. The foregoing substrate enables the electrodes and the light modulation layer to be provided with crystal semiconductor by an epitaxial manner. Thus, a further stable operation can be realized.

Specifically, a p-type and dense impurity semiconductor to serve as the transparent electrode of the positive electrode adjacent to the substrate is epitaxial-grown. Then, the n-type semiconductor layer is formed on the p-type semiconductor layer by epitaxial growth, diffusion of n-type semiconductor impurities or ion implantation. Then, the insulating layer is formed on the n-type semiconductor layer. Finally, the transparent electrode made of the metal compound is formed to serve as the upper transparent electrode for the negative electrode.

The insulating layer may be made of an oxide film or a nitride film. As an alternative to this, ceramic, such as ferroelectric material, may be employed.

A variety of the other materials and forming methods may be employed within the spirit of the present invention.

FIG. 5 is a diagram showing the cross sectional structure of a light modulation device according to a second embodiment of the present invention.

Figure 5A:
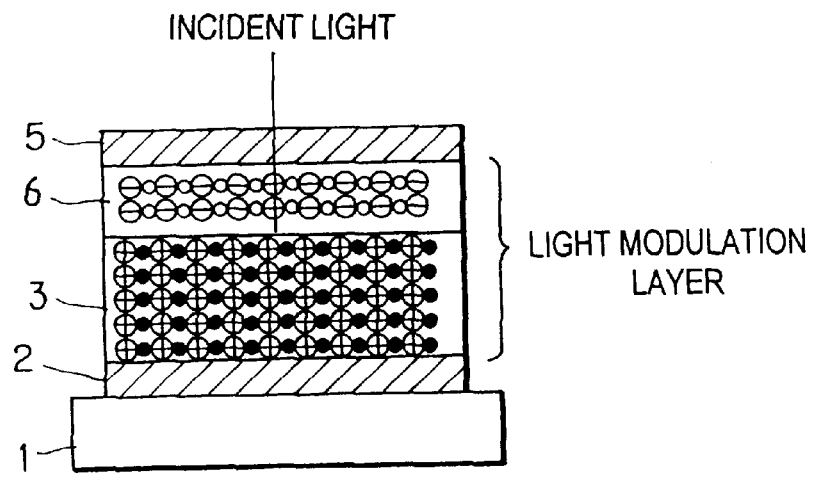
FIG. 5(a) and 5(b) are the diagrams showing the principle of the operation of a light modulation device according to the embodiment of the present invention.

The light modulation device according to this embodiment, as shown in FIG. 5(a), has a structure of the p-n junction semiconductor incorporating a lower transparent electrode 2 formed on the upper surface of the transparent substrate 1. Moreover, an n-type semiconductor layer 3 which is a semiconductor containing doped impurities at a high density is formed on the upper surface of the lower transparent electrode 2. A p-type semiconductor layer 6 doped with impurities at a density higher than that of impurities in the n-type semiconductor layer 3 is formed on the upper surface of the n-type semiconductor 5. Moreover, an upper transparent electrode 5 is formed on the p-type semiconductor layer. Hereinafter, a pair of the n-type semiconductor layer 3 and the p-type semiconductor layer 6 is called a light modulation layer.

In the state shown in FIG. 5(a), donor impurity ions and electrons are uniformly dispersed in the n-type semiconductor layer 3. Thus, a state free from lowering of the carrier density is realized. Although a depletion region exists adjacent to the interface between the n-type semiconductor layer 3 and the p-type semiconductor layer 6 owing to the contact, the region is omitted to simplify the description. Therefore, the reflectance or the adsorbance of the n-type semiconductor layer 3 is raised. As a result, incident light introduced from an upper position penetrates the transparent electrode 5 and the p-type semiconductor layer 6. Light is reflected by the surface of the n-type semiconductor layer 3 or adsorbed in the n-type semiconductor layer 3. As a result, incident light is not emitted to a portion below the transparent substrate 1.

To enable incident light to penetrate the p-type semiconductor layer 6, it is preferable that the thickness of the p-type semiconductor layer 6 is reduced sufficiently as compared with the wavelength.

Figure 5B:
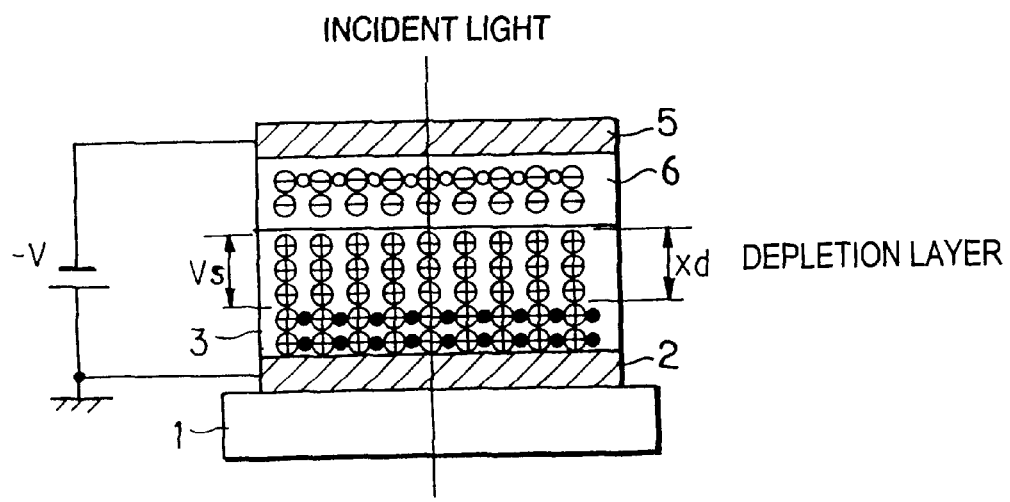

FIG. 5(b) shows a state in which the transparent electrodes 2 and 5 of the light modulation device shown in FIG. 5(a) have been applied with inverse bias voltage. That is, the lower transparent electrode 2 is grounded and the positive electrode of the power source, the voltage of which is −V, is connected to the lower transparent electrode 2 and the negative electrode is connected to the upper transparent electrode 5. Thus, voltage −V has been applied to the upper transparent electrode. Referring to FIG. 5(b), electrons in the n-type semiconductor layer 3 are moved to the lower transparent electrode 2. Thus, a depletion layer in which electron carriers are depleted is formed. Therefore, the plasma wavelength $\lambda_p$ of the n-type semiconductor layer 3 is shifted to the long wavelength region. As a result, the surface reflectance of the n-type semiconductor layer 3 or the adsorbance in the n-type semiconductor layer 3 is lowered, causing the light permeability to be raised. Thus, incident light introduced from an upper portion penetrates the n-type semiconductor layer 3, and then emitted from a position below the transparent substrate 1. FIG. 5(b) shows the thickness $x_d$ of the depletion layer which is shortened. In actuality, the foregoing thickness may be substantially the same as the thickness of the n-type semiconductor layer 3.

The thickness $x_d$ of the depletion layer formed in the n-type semiconductor layer 3 is expressed by the relationship shown in equation (5) as shown in the first embodiment.

In this embodiment, equation (5) is a result of an approximation performed on an assumption that the density Na of impurities in the p-type semiconductor layer is sufficiently high as compared with the density Nd of impurities in the n-type semiconductor layer. Assuming that the potential of the p-n junction realized when no electric field is being applied is Vc and the inverse bias voltage which must be applied is Vr, Vs=Vr+Vc. Therefore, the width $x_d$ of the depletion layer is changed to correspond to the inverse bias voltage Vr. When voltage is applied in such a manner that the width $x_d$ of the depletion layer is enlarged to about the thickness of the n-type semiconductor layer, substantially the overall body of the n-type semiconductor layer is depleted. Therefore, electron carriers do not spatially exist. When the wavelength $\lambda_0$ of incident light is longer than the plasma wavelength $\lambda_p$ of the n-type semiconductor layer, the reflectance of incident light is furthermore raised.

A third embodiment of the present invention will now be described with reference to FIG. 6. FIG. 6 is a diagram showing the cross sectional structure of a laminated light modulation device according to this embodiment.

The light modulation device has a lower transparent electrode 2 formed on the upper surface of a transparent substrate 1. Then, light modulation layers $a_1$ to $a_m$ each incorporating an n-type semiconductor layer 3 and an insulating layer 4 are laminated on the upper surface of the lower transparent electrode 2. Then, an upper transparent electrode 5 is formed on the upper surface of the insulating layer 4 of the uppermost layer $a_m$.

The number of the laminated light modulation layers is five in this embodiment. In general, an arbitrary number of layers may be laminated.

When inverse bias voltage (−V) is applied to a space between the lower transparent electrode 2 and the upper transparent electrode 5 of the laminated light modulation device, each of the light modulation layers a is polarized. Therefore, a depletion layer is formed in each of the n-type semiconductor layers, as shown in FIG. 4(b). As a result, incident light introduced from an upper position passes through the light modulation layer owning to reduction in the reflectance or the adsorbance, and then emitted from the transparent substrate 1.

When the voltage which must be applied is made to be 0 [V], the depletion layer in each semiconductor layer disappears. Thus, the adsorbance or the reflectance of the n-type semiconductor layer 3 is raised. As a result, incident light introduced from the upper position is not emitted from the lower portion of the transparent substrate 1. Note that the direction of incident light may be inverted.

According to this embodiment, a structure having the multiplicity of the light modulation layers is employed. As a result, the thickness of each of the light modulation layers can be reduced. As a result, depleting can efficiently be performed. Therefore, even low applied voltage is able to elongate the depletion layer region in the overall body of the device. As a result, the light modulation performance can furthermore be improved.

A fourth embodiment of the present invention will now be described with reference to FIG. 7. FIG. 7 is a diagram showing the cross sectional structure of a laminated light modulation device according to this embodiment.

The light modulation device has a lower transparent electrode 2 formed on the upper surface of a transparent substrate 1. Then, light modulation layers $a_1$ to $a_m$ each incorporating an n-type semiconductor layer 3 and a p-type semiconductor layer 6 are laminated on the upper surface of the lower transparent electrode 2. Then, an upper transparent electrode 5 is formed on the upper surface of the p-type semiconductor layer 6 of the uppermost layer $a_m$. Note that the number of the light modulation layers, which must be laminated, may be arbitrary be determined.

When inverse bias voltage (−V) is applied to a space between the lower transparent electrode 2 and the upper transparent electrode 5 of the laminated light modulation device, each of the light modulation layers a1 to am is polarized. Therefore, a depletion layer is formed in each of the n-type semiconductor layers, as shown in FIG. 5(b). As a result, incident light introduced from an upper position passes through the light modulation layer owning to reduction in the reflectance or the adsorbance, and then emitted from the transparent substrate 1 when the wavelength $\lambda_0$ of the incident light is longer than the plasma wavelength $\lambda_p$ of the n-type semiconductor layer.

When the voltage which must be applied is made to be 0 [V], the depletion layer in each n-type semiconductor layer disappears. Thus, the reflectance or the reflectance of the n-type semiconductor layer 3 is raised. Therefore, the permeability of light is lowered. Note that the direction of incident light may be inverted.

According to this embodiment, a structure having the multiplicity of the light modulation layers is employed. As a result, the thickness of each light modulation layers can be reduced. As a result, depleting can efficiently be performed. Therefore, even low applied voltage is able to elongate the depletion layer region in the overall body of the device. As a result, the light modulation performance can furthermore be improved.

Figure 8:
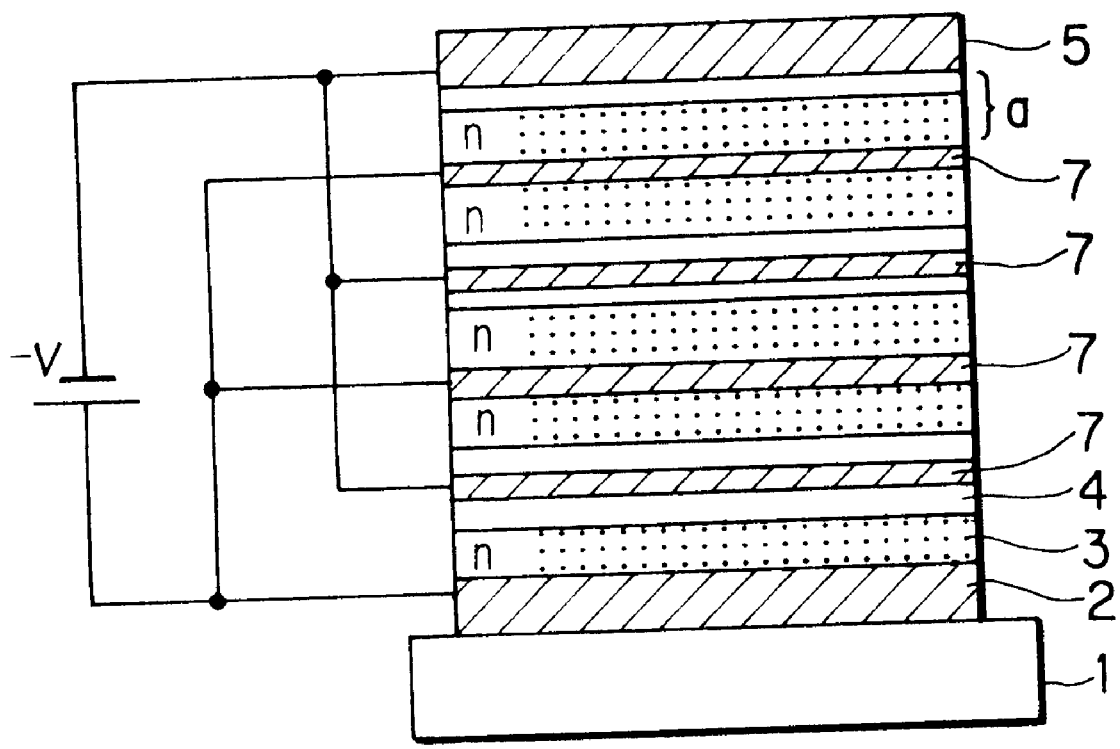
FIG. 8 is a diagram showing the cross sectional structure and wiring between layers of a light modulation device according to a fifth embodiment of the present invention.

A fifth embodiment of the present invention will now be described with reference to FIG. 8. FIG. 8 is a diagram showing the cross sectional structure of a laminated light modulation device according to this embodiment.

The light modulation device according to this embodiment has a structure that all of the electrodes, which are connected to the n-type semiconductor layer, are connected to the positive electrode of the power source. All of the electrodes, which are connected to the insulating layers, are connected to the negative electrode of the power source. Therefore, electron carriers are extracted from all of the n-type semiconductor layers owning to application of voltage so that depletion layers are formed.

In the foregoing case, the electrodes may be made of a transparent metal compound or a p-type semiconductor. An n-type semiconductor layer may also be used as the electrode to omit the electrode.

The above-mentioned structure causes the reflectance or the adsorbance of incident light owning to application of voltage. On the other hand, the permeability is raised.

Figure 9A:
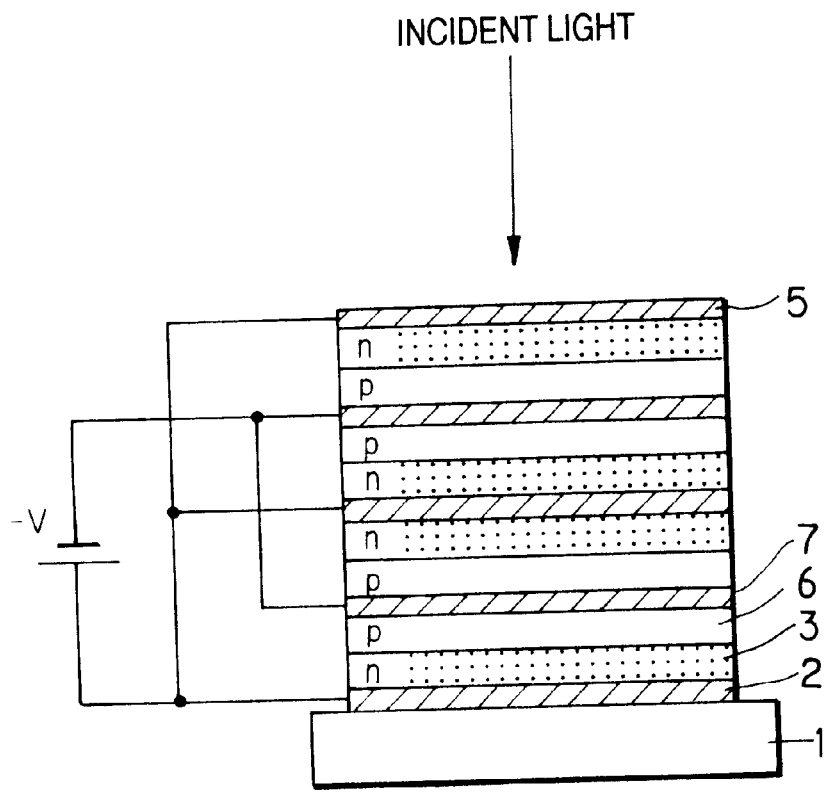
FIG. 9(a) and 9(b) are the diagrams showing the cross sectional structure and wiring between layers of a light modulation device according to a sixth embodiment of the present invention.
Figure 9B:
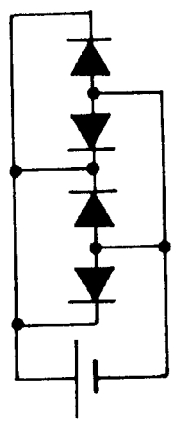

A sixth embodiment of the present invention will now be described with reference to FIG. 9. FIG. 9(a) is a diagram showing the cross sectional structure and wiring between the layers of a light modulation device according to this embodiment. FIG. 9(b) shows an equivalent circuit of the light modulation device.

The cross sectional structure of the light modulation device according to this embodiment is formed into a multi-layered light modulation layer by inserting an intermediate transparent electrode 7 between the lower transparent electrode 2 and the upper transparent electrode 5. The light modulation device according to this embodiment has a structure that all of electrodes, which are connected to the n-type semiconductor layer 3, are connected to the positive electrode of the power source. Moreover, electrodes, which are connected to the p-type semiconductor layer 6, are connected to the negative electrode of the power source. Therefore, all of the p-n junction portions are inversely biased owning to application of the voltage.

According to this embodiment, the light modulation performance using depleting of the n-type semiconductor layer 3 can furthermore be improved. The state of penetration or non-penetration (reflection or absorption) of incident light can be stably changed at low voltage. Moreover, higher speed operation can be performed.

Figure 10:
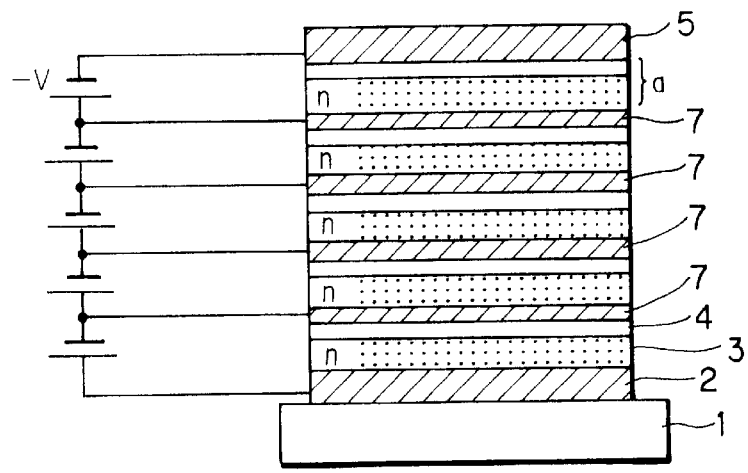
FIG. 10 is a diagram showing the cross sectional structure and wiring between layers of a light modulation device according to a seventh embodiment of the present invention.

A seventh embodiment of the present invention will now be described with reference to FIG. 10. FIG. 10 is a diagram showing the cross sectional structure of a light modulation device according to this embodiment and wiring between layers.

The light modulation device according to this embodiment incorporates a plurality of layers consisting of an n-type semiconductor layer 3, an insulating layer 4 and an intermediate transparent electrode 7 which are sequentially laminated on a lower transparent electrode 2. The uppermost electrode is formed into an upper transparent electrode 5. Moreover, a power source (−V) is connected between the electrodes of each light modulation layer a. Therefore, each of the n-type semiconductor layer is formed into the depleted structure because electron carriers are extracted owning to application of the voltage.

As a result of the above-mentioned structure, light modulation can be performed to correspond to application of the voltage similarly to the third embodiment.

Figure 11:
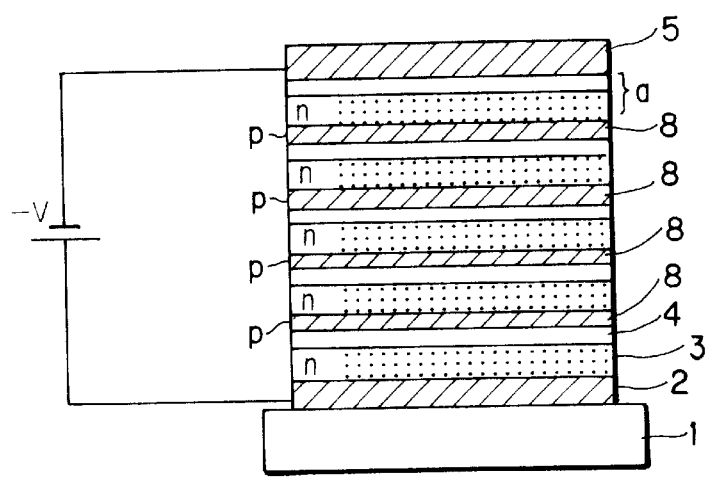
FIG. 11 is diagram showing the cross sectional structure and wiring between layers of a light modulation device according to an eighth embodiment of the present invention.

An eighth embodiment of the present invention will now be described with reference to FIG. 11. FIG. 11 is a diagram showing the cross sectional structure of a light modulation device according to this embodiment and wiring between the layers.

The light modulation device according to this embodiment incorporates a p-type semiconductor layer 8 which is provided in place of the intermediate transparent electrode according to the fourth embodiment and in which impurities are diffused at a high density. The p-type semiconductor layer 8, having a significantly high electric conductivity, serves similarly to an electrode to cause the inside portion of the layer to uniformly be conducted. A lower transparent electrode 2 is connected to a positive electrode of the power source, while an upper transparent electrode 5 is connected to a negative electrode of the power source.

As a result of the above-mentioned structure, electron carriers of the n-type semiconductor layer which are moved owning to application of the voltage are re-bound at the interface of the p-type semiconductor layer 8. Therefore, the overall body of the n-type semiconductor layer 3 can be depleted.

Since the structure provided with the p-type semiconductor layer 8 is employed, depleting of each n-type semiconductor layer 3 can reliably be performed in the overall inner region of the layer.

Figure 12:
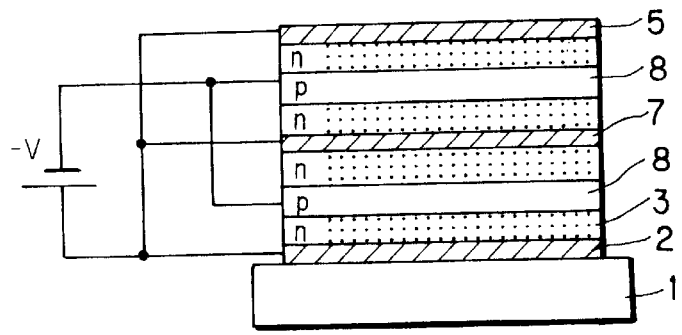
FIG. 12 is a diagram showing the cross sectional structure and wiring between layers of a laminated light modulation device according to a ninth embodiment of the present invention.

A ninth embodiment of the present invention will now be described with reference to FIG. 12. FIG. 12 is a diagram showing an exposing apparatus constituted by laminating light modulation devices according to this embodiment.

In this embodiment, a p-type semiconductor layer 8 in which impurities are diffused at a high density is formed.

Moreover, the negative electrode of the power source is connected to the p-type semiconductor layer 8. Since the p-type semiconductor layer 8 has a considerably high electric conductivity, the p-type semiconductor layer 8 serves similarly to the electrode. Thus, voltage can be exerted uniformly in the layer. Therefore, deviation of movements of positive holes toward the connection portion with the power source can substantially be prevented. Note that an equivalent circuit of the light modulation device according to this embodiment is similar to that shown in FIG. 9(*b*).

According to this embodiment, the electrode which is connected to the p-type semiconductor layer can be omitted. Thus, the structure can be simplified and the manufacturing process can be simplified. As a result, the cost can be reduced.

Figure 13A:
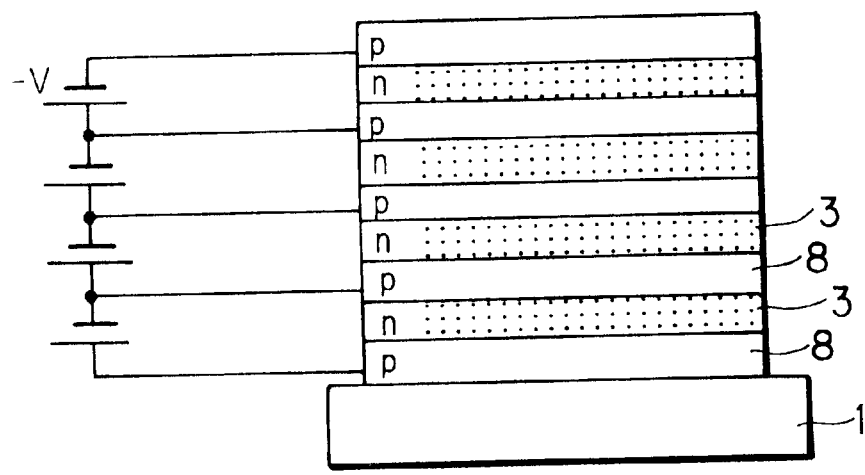
FIG. 13(a) and 13(b) are the diagrams showing the cross sectional structure and wiring between layers of a laminated light modulation device according to a tenth embodiment of the present invention.
Figure 13B:
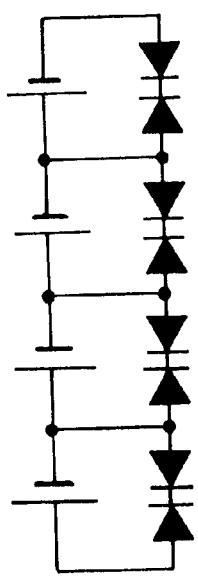

A tenth embodiment of the present invention will now be described with reference to FIG. 13. FIG. 13 is a diagram showing the structure of an exposing apparatus constituted by laminating light modulation devices according to this embodiment.

In this embodiment, p-n junctions are successively laminated so that the p-type semiconductor layer 8 also serves as the electrode. As a result, electron carriers can be extracted from all of the n-type semiconductor layers owning to application of the voltage. Thus, the inside portion of the layer can be depleted so that light modulation is performed.

Figure 14:
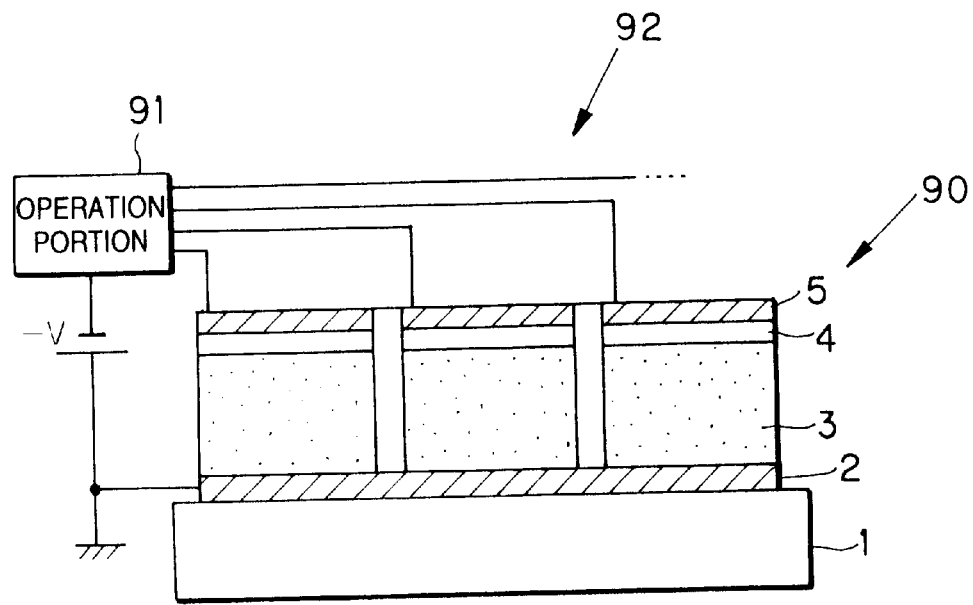
FIG. 14 is a diagram showing the structure of an exposing device according to an eleventh embodiment of the present invention.

An eleventh embodiment of the present invention will now be described with reference to FIG. 14. FIG. 14 shows a light modulation portion 90 formed by one-dimensionally or two-dimensionally disposing light modulation devices. In this embodiment, each of the light modulation devices in the light modulation portion 90 can simultaneously or independently, in block unit, be operated by an operating portion 91. As a result, the light modulation devices are able to act as an exposing device 92 which is capable of performing one-dimensional or two-dimensional light modulation.

When the light modulation devices are operated in block units or independently operated, a multi-gradation display using area gradation is permitted.

The operating portion 91 having the light modulation devices disposed two-dimensionally may be operated by a simple matrix operation or an active matrix operation. When the simple matrix operation is employed, the structure can be simplified. When the active matrix operation is employed, a high contrast ratio can be realized.

The foregoing structure enables the reflectance and the adsorbance of the light modulation devices disposed one-dimensionally or two-dimensionally to be set to correspond to the state of application of the voltage. Therefore, an exposing device which is capable of operating at high speed can be provided with a simple structure.

Figure 15:
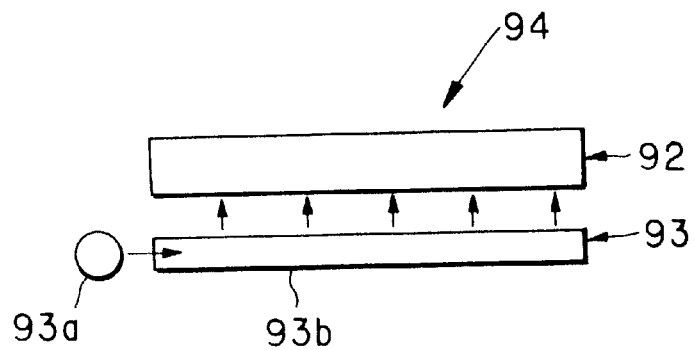
FIG. 15 is a diagram showing the structure of a display unit according to a twelfth embodiment of the present invention.
Figure 16:
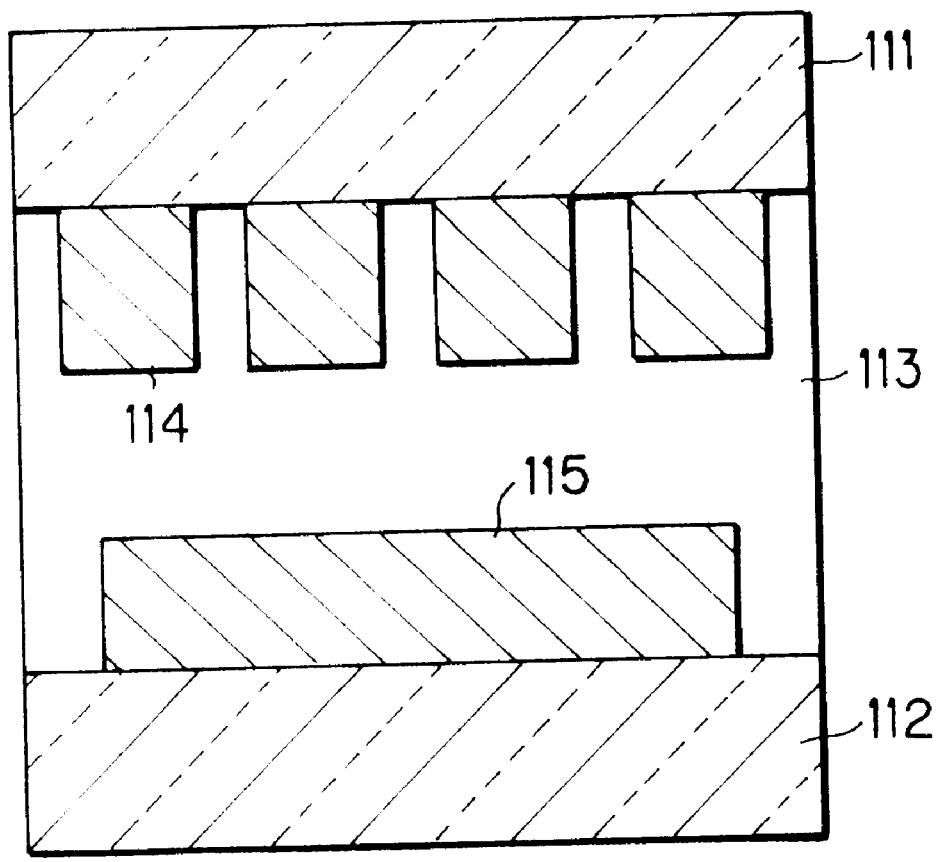
FIG. 16 is a diagram showing an example of a conventional light modulation device.

A twelfth embodiment of the present invention will now be described with reference to FIG. 15. FIG. 15 is a diagram showing a display unit 94 incorporating a flat light source 93 disposed opposite to the structure of the exposing device 92 according to the sixth embodiment.

The display unit 94 according to this embodiment incorporates the flat light source 93 disposed opposite to a light modulation portion 90 of the exposing device 92. Thus, light emitted from the flat light source 93 is displayed through the light modulation portions 90 disposed one-dimensionally or two-dimensionally. When the light modulation portions 90 are disposed one-dimensionally, the flat light source 93 may be a linear light source.

The flat light source 93 is composed of, for example, an infrared-ray source 93*a* which serves as a light source, and a light conductive plate 93b. Light emitted from infrared-ray source 93a is guided to the surface of the light-conduction plate 93b. Light plane-radiated from the infrared-ray source 93a is made incident on the light modulation portion 90. In accordance with a state of application of the voltage between the electrodes of each of the exposing devices, light is selectively brought to a penetration state or a non-penetration state (reflection or adsorption). Thus, an arbitrary pattern can be displayed.

As described above, the light modulation portion is constituted by combining a plurality of the light modulation devices to form the exposing device. Moreover, the flat light source is disposed adjacent to either side of the exposing device so that a display unit is realized.

When the display unit is constituted, a structure may be employed in which light which is introduced into each light modulation device is light emitted from a white light source. Moreover, the voltage between the electrodes is appropriately adjusted to permit selective penetration of light having an arbitrary wavelength component. As a result, high-speed color display can be performed with a simple structure.

When light having a specific wavelength is introduced and the level of the voltage which is applied between the electrodes is adjusted or application of the voltage is duty-controlled, the thickness of the depletion layer in the semiconductor layer or an amount of penetration of light per unit time is changed. In this case, multi-gradation control can be performed.

In each of the above-mentioned embodiments, the control is performed such that the permeability of light is lowered in a state where the voltage is not applied. When the inverse bias voltage is applied, the permeability of light is raised. Forward bias voltage may be applied to furthermore reduce the width of the depletion layer. Moreover, carriers are injected to lower the permeability of light.

In each of the foregoing embodiments, incident light is brought to the penetration state or non-penetration state (reflection or adsorption) in the light modulation device so as to perform light modulation by using change in the permeability of light. A device may be constituted which performs light modulation by using change in the reflectance of light by causing incident light to be reflected by the surface of the light modulation device. Thus, a device system using change in reflected light may be realized.

In each of the above-mentioned embodiments, light modulation is performed mainly by controlling carriers in the n-type semiconductor layer. Light modulation may be performed by depleting and injection of carriers of the p-type semiconductor, that is, positive holes.

The light modulation device, the exposing device and the display unit according to the present invention use change in the reflectance and that in the adsorbance corresponding to the change in the density of carriers of the semiconductor. Therefore, light modulation can stably be performed even with low operating voltage. As compared with liquid crystal, the operation can be performed at higher speed.

Since planar light modulation can be performed, uniform light modulation can be performed with a simple structure. Since the simple structure is permitted, a low-cost product suitable to mass production can be provided.

What is claimed is:

1. A light modulation device comprising:
a semiconductor layer formed directly on an upper surface of a lower transparent electrode; and
an upper transparent electrode formed directly on an insulating layer, said insulating layer being formed directly on said semiconductor layer,
wherein an electric field for depleting carriers of said semiconductor layer is applied to a space between said upper transparent electrode and said lower transparent electrode so as to change at least either one of a reflectance of light and an adsorbance of light.

2. A light modulation device having a p-n junction semiconductor structure, comprising:
a first semiconductor layer made of one of an n-type semiconductor material and a p-type semiconductor material and formed on an upper surface of a lower transparent electrode;
a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
an upper transparent electrode formed on the upper surface of said second semiconductor layer, wherein an electric field for depleting carriers of said semiconductor layers is applied to a space between said upper transparent electrode and said lower transparent electrode so as to change at least either one of a reflectance of light and an adsorbance of light.

3. A light modulation device according to claims 1 or 2, wherein when the wavelength of light which must be modulated is $\lambda_0$, a velocity of light in a vacuum is c and Planck's constant is h, and a band gap energy Eg of said semiconductor satisfies the following relationship:

$$Eg > hc/\lambda_0.$$

4. A light modulation device according to claims 1 or 2, wherein a band gap energy Eg of said semiconductor is 2 or greater.

5. A light modulation device according to claims 1 or 2, wherein a wavelength $\lambda_0$ of light which must be modulated is shorter than a plasma wavelength $\lambda_p$ of said semiconductor layer.

6. A light modulation device according to claims 1 or 2, wherein a wavelength $\lambda_0$ of light which must be modulated is longer than a plasma wavelength $\lambda_p$ of said semiconductor layer.

7. A light modulation device according to claims 1 or 2, wherein an inverse bias voltage is applied in such a manner that a thickness of a depleted layer is substantially a same as a thickness of said semiconductor layer.

8. A light modulation device according to claim 1, wherein a plurality of light modulation layers each incorporating said semiconductor layer and an insulating layer are laminated on an upper surface of said lower transparent electrode, and said upper transparent electrode is formed on an uppermost light modulation layer.

9. A light modulation device according to claim 2, wherein a plurality of light modulation layers each incorporating said first semiconductor layer and said second semiconductor layer formed on an upper surface of said first semiconductor layer are laminated on an upper surface of said lower transparent electrode, and said upper transparent electrode is formed on an uppermost light modulation layer.

10. A light modulation device according to claim 8, wherein at least one intermediate transparent electrode is formed between said upper and lower transparent electrodes, said light modulation layer is interposed between said electrodes, and an electric field for depleting said semiconductor layers is applied to a space between said electrodes.

11. A light modulation device according to claim 9, wherein at least one intermediate transparent electrode is formed between said upper and lower transparent electrodes, an npn semiconductor layer constituted by sequentially laminating an n-type semiconductor layer, a p-type semiconductor layer and an n-type semiconductor layer is interposed between said electrodes, and an electric field for depleting said semiconductor layers is applied to a space between said electrode and said p-type semiconductor layer.

12. A light modulation device according to claims 8 or 10, wherein at least one p type semiconductor layer, in which impurities are diffused at a high density is formed between said upper transparent electrode and said lower transparent electrode.

13. An exposing device according to claims 1 or 2, wherein more than one light modulation device are disposed either one of one-dimensionally and two-dimensionally.

14. A display unit according to claims 1 or 2, wherein said light modulation device is disposed either one of one-dimensionally and two-dimensionally and a flat light source is disposed opposite to said disposed light modulation device.

15. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light; and
   wherein when the wavelength of light which must be modulated is $\lambda_0$, a velocity of light in a vacuum is c and Planck's constant is h, and a band gap energy Eg of said semiconductor satisfies the following relationship:

$$Eg > hc/\lambda_0.$$

16. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light; and
   wherein a band gap energy Eg of said semiconductor is 2 or greater.

17. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light; and
   wherein a wavelength $\lambda_0$ of light which must be modulated is shorter than a plasma wavelength $\lambda_p$ of said semiconductor layer.

18. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light; and
   wherein a wavelength $\lambda_0$ of light which must be modulated is longer than a plasma wavelength $\lambda_p$ of said semiconductor layer.

19. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light; and
   wherein an inverse bias voltage is applied in such a manner that a thickness of a depleted layer is substantially a same as a thickness of said semiconductor layer.

20. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light;
   wherein a plurality of light modulation layers each incorporating said semiconductor layer and an insulating layer are laminated on an upper surface of said lower transparent electrode, and said upper transparent electrode is formed on an uppermost light modulation layer; and
   wherein at least one intermediate transparent electrode is formed between said upper and lower transparent electrodes, said light modulation layer is interposed between said electrodes, and an electric field for depleting said semiconductor layers is applied to a space between said electrodes.

21. A light modulation device comprising:
   a semiconductor layer formed on an upper surface of a lower transparent electrode; and
   an upper transparent electrode formed on an upper surface of said semiconductor layer through an insulating layer,
   wherein an electric field for depleting carriers of said semiconductor layer is applied to a space between said upper transparent electrode and said lower transparent electrode so as to change at least either one of a reflectance of light and an adsorbance of light;
   wherein a plurality of light modulation layers are incorporating said semiconductor layer and an insulating layer are laminated on an upper surface of said lower transparent electrode, and said upper transparent electrode is formed on an uppermost light modulation layer; and
   wherein at least one p type semiconductor layer, in which impurities are diffused at a high density is formed between said upper transparent electrode and said lower transparent electrode.

22. A light modulation device having a p-n junction semiconductor structure, comprising:
- a first semiconductor layer made of one of an n-type semiconductor material and a p-type semiconductor material and formed on an upper surface of a lower transparent electrode;
- a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
- an upper transparent electrode formed on the upper surface of said second semiconductor layer,
- wherein an electric field for depleting carriers of said semiconductor layers is applied to a space between said upper transparent electrode and said lower transparent electrode so as to change at least either one of a reflectance of light and an adsorbance of light; and
- wherein when the wavelength of light which must be modulated is $\lambda_0$, a velocity of light in a vacuum is c and Planck's constant is h, and a band gap energy Eg of said semiconductor satisfies the following relationship:

$$Eg > hc/\lambda_0.$$

23. A light modulation device having a p-n junction semiconductor structure, comprising:
- a first semiconductor layer made of one of an n-type semiconductor material and a p-type semiconductor material and formed on an upper surface of a lower transparent electrode;
- a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
- an upper transparent electrode formed on the upper surface of said second semiconductor layer,
- wherein an electric field for depleting carriers of said semiconductor layers is applied to a space between said upper transparent electrode and said lower transparent electrode so as to change at least either one of a reflectance of light and an adsorbance of light; and
- wherein a band gap energy Eg of said semiconductor is 2 or greater.

24. A light modulation device having a p-n junction semiconductor structure, comprising:
- a first semiconductor layer made of one of an n-type semiconductor material and a p-type semiconductor material and formed on an upper surface of a lower transparent electrode;
- a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
- an upper transparent electrode formed on the upper surface of said second semiconductor layer,
- wherein an electric field for depleting carriers of said semiconductor layers is applied to a space between said upper transparent electrode and said lower transparent electrode so as to change at least either one of a reflectance of light and an adsorbance of light; and
- wherein a wavelength $\lambda_0$ of light which must be modulated is shorter than a plasma wavelength $\lambda_p$ of said semiconductor layer.

25. A light modulation device having a p-n junction semiconductor structure, comprising:
- a first semiconductor layer made of one of an n-type semiconductor material and a p-type semiconductor material and formed on an upper surface of a lower transparent electrode;
- a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
- an upper transparent electrode formed on the upper surface of said second semiconductor layer,
- wherein an electric field for depleting carriers of said semiconductor layers is applied to a space between said upper transparent electrode and said lower transparent electrode so as to change at least either one of a reflectance of light and an adsorbance of light; and
- wherein a wavelength $\lambda_0$ of light which must be modulated is longer than a plasma wavelength $\lambda_p$ of said semiconductor layer.

26. A light modulation device having a p-n junction semiconductor structure, comprising:
- a first semiconductor layer made of one of an n-type semiconductor material and a p-type semiconductor material and formed on an upper surface of a lower transparent electrode;
- a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
- an upper transparent electrode formed on the upper surface of said second semiconductor layer,
- wherein an electric field for depleting carriers of said semiconductor layers is applied to a space between said upper transparent electrode and said lower transparent electrode so as to change at least either one of a reflectance of light and an adsorbance of light; and
- wherein an inverse bias voltage is applied in such a manner that a thickness of a depleted layer is substantially a same as a thickness of said semiconductor layer.

27. A light modulation device having a p-n junction semiconductor structure, comprising:
- a first semiconductor layer made of one of an n-type semiconductor material and a p-type semiconductor material and formed on an upper surface of a lower transparent electrode;
- a second semiconductor layer formed on an upper surface of said first semiconductor layer and made of the p-type semiconductor material when said first semiconductor layer is made of the n-type semiconductor and made of the n-type semiconductor material when the first semiconductor layer is made of the p-type material; and
- an upper transparent electrode formed on the upper surface of said second semiconductor layer,
- wherein an electric field for depleting carriers of said semiconductor layers is applied to a space between said upper transparent electrode and said lower transparent electrode so as to change at least either one of a reflectance of light and an adsorbance of light;

wherein a plurality of light modulation layers each incorporating said first semiconductor layer and said second semiconductor layer formed on an upper surface of said first semiconductor layer are laminated on an upper surface of said lower transparent electrode, and said upper transparent electrode is formed on an uppermost light modulation layer; and wherein at least one intermediate transparent electrode is formed between said upper and lower transparent electrodes, an npn semiconductor layer constituted by sequentially laminating an n-type semiconductor layer, a p-type semiconductor and an n-type semiconductor layer is interposed between said electrodes, and an electric field for depleting said semiconductor layers is applied to a space between said electrode and said p-type semiconductor layer.

* * * * *